(12) United States Patent
Parvey (10) Patent No.: US 8,870,207 B2
(45) Date of Patent: Oct. 28, 2014

(54) MOTORCYCLE PIVOTABLE PASSENGER PEG ASSEMBLY

(75) Inventor: Daniel Parvey, New Richmond, WI (US)

(73) Assignee: Kuryakyn Holdings, LLC, Somerset, WI (US)

( * ) Notice: Subject to any disclaimer, the term of this patent is extended or adjusted under 35 U.S.C. 154(b) by 134 days.

(21) Appl. No.: 13/372,165

(22) Filed: Feb. 13, 2012

(65) Prior Publication Data

US 2012/0205888 A1    Aug. 16, 2012

Related U.S. Application Data

(60) Provisional application No. 61/463,398, filed on Feb. 16, 2011.

(51) Int. Cl.
 *B60R 3/00* (2006.01)
 *B62J 25/00* (2006.01)

(52) U.S. Cl.
 CPC ........................................ *B62J 25/00* (2013.01)
 USPC ................ 280/166; 280/163; 180/219; 296/5

(58) Field of Classification Search
 CPC ....................................................... B62J 25/00
 USPC ........ 280/291, 288.4, 163, 164.1, 166, 304.4; 74/564, 560; D12/114; 180/219; 296/75
 See application file for complete search history.

(56) References Cited

U.S. PATENT DOCUMENTS

| | | | |
|---|---|---|---|
| 4,934,210 A * | 6/1990 | Suzuki | 74/512 |
| 5,354,086 A * | 10/1994 | Mueller | 280/291 |
| 5,456,138 A | 10/1995 | Nutile et al. | |
| 5,779,254 A | 7/1998 | James et al. | |
| 6,142,499 A * | 11/2000 | Hsieh et al. | 280/291 |
| 6,152,474 A * | 11/2000 | Rupert | 280/291 |
| 6,173,983 B1 * | 1/2001 | Moore | 280/291 |
| 6,893,038 B2 * | 5/2005 | Egan | 280/291 |
| 6,957,821 B2 * | 10/2005 | Gorman et al. | 280/291 |
| 6,962,095 B2 | 11/2005 | Winfield | |
| 7,114,739 B2 * | 10/2006 | Colano | 280/291 |
| D579,383 S | 10/2008 | Owyang | |
| 7,631,574 B2 * | 12/2009 | Leone | 74/513 |
| 7,637,523 B2 | 12/2009 | Fouhy | |
| 7,793,961 B2 | 9/2010 | Day | |
| 7,832,516 B2 * | 11/2010 | Bagnariol | 180/219 |
| 8,181,982 B1 * | 5/2012 | Ward | 280/291 |
| 2009/0108560 A1 * | 4/2009 | Mountz et al. | 280/291 |

OTHER PUBLICATIONS

Debrix Cycles™. Passenger Pegs, Footpegs, and related accessories and hardware on p. 1 of 2. © 2010. [Retrieved on Oct. 31, 2011]. Retrieved from the Internet <URL: http://www.debrix.com/category-s/263.htm>.

* cited by examiner

*Primary Examiner* — Katy M Ebner
*Assistant Examiner* — Emma K Frick
(74) *Attorney, Agent, or Firm* — Dicke, Billig & Czaja, PLLC (57) ABSTRACT

A pivotable passenger peg assembly that is mountable to a motorcycle includes an elongate arm with a cylindrical opening. The elongate arm is pivotally mounted on a first cylindrical member that is mountable to a motorcycle. The first cylindrical member is configured with a stepped outer cylindrical surface that cooperates with a detent formed within the cylindrical opening of the arm to limit the pivotal range of the arm. The first cylindrical member may be incorporated into a motorcycle mount or may be adapted to attach to a motorcycle mount.

9 Claims, 7 Drawing Sheets

MOTORCYCLE PIVOTABLE PASSENGER PEG ASSEMBLY

CROSS-REFERENCE TO RELATED APPLICATIONS

This application claims the benefit of co-pending U.S. Provisional Patent Application Ser. No. 61/463,398, filed Feb. 16, 2011.

BACKGROUND

The present invention relates generally to motorcycle foot support structures, and specifically to adjustable foot support assemblies.

DETAILED DESCRIPTION

Figure 1:
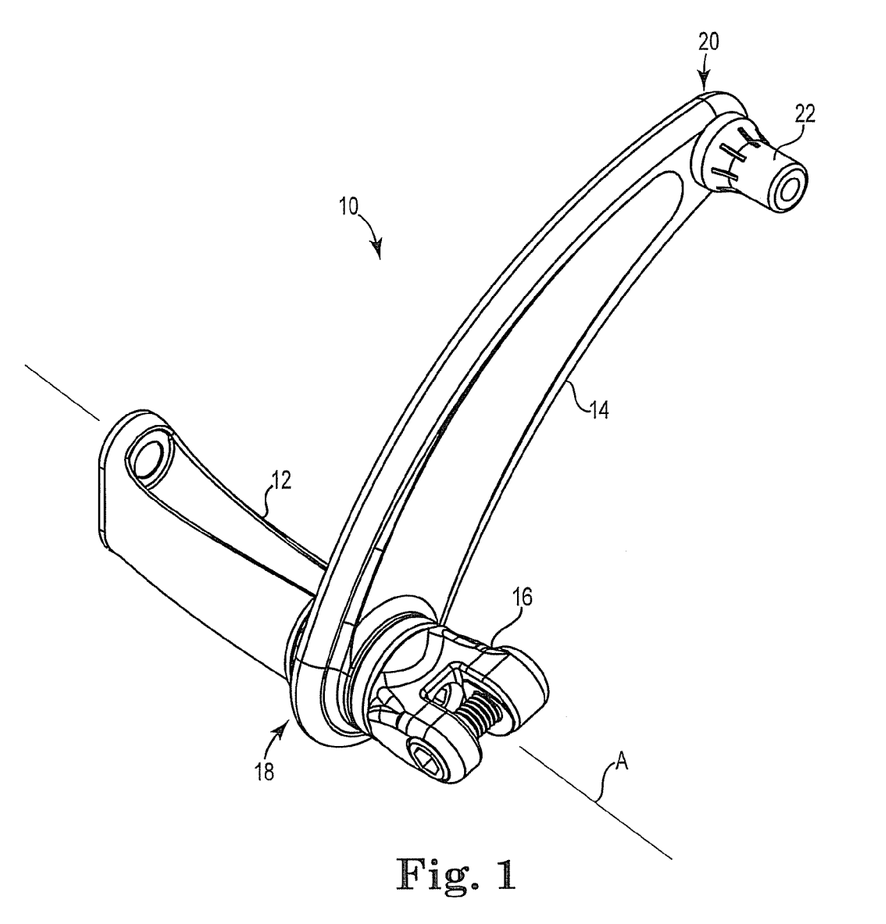
FIG. 1 is a perspective view of a first embodiment of a motorcycle pivotable passenger peg assembly of the present invention.

FIG. 1 is a perspective view of a first embodiment of a motorcycle pivotable passenger peg assembly 10. Assembly 10 is generally comprised of a motorcycle mount 12, an arm 14 and a peg mount 16. Mount 12 mounts assembly 10 relative to a motorcycle structure such a motorcycle frame or other motorcycle component that is securely mounted relative to the motorcycle frame. Arm 14 is situated between mount 12 and peg mount 16 and is secured at a lower end portion 18 of arm 14 to mount 12 by a connection of peg mount 16 to mount 12. An upper portion 20 of arm 14 carries a second peg mount 22. As will be disclosed in greater detail hereinafter, arm 14 is configured to pivot about an axis A of mount 12 to allow the second peg mount 22 to be positioned either fore or aft of peg mount 16.

Figure 2:
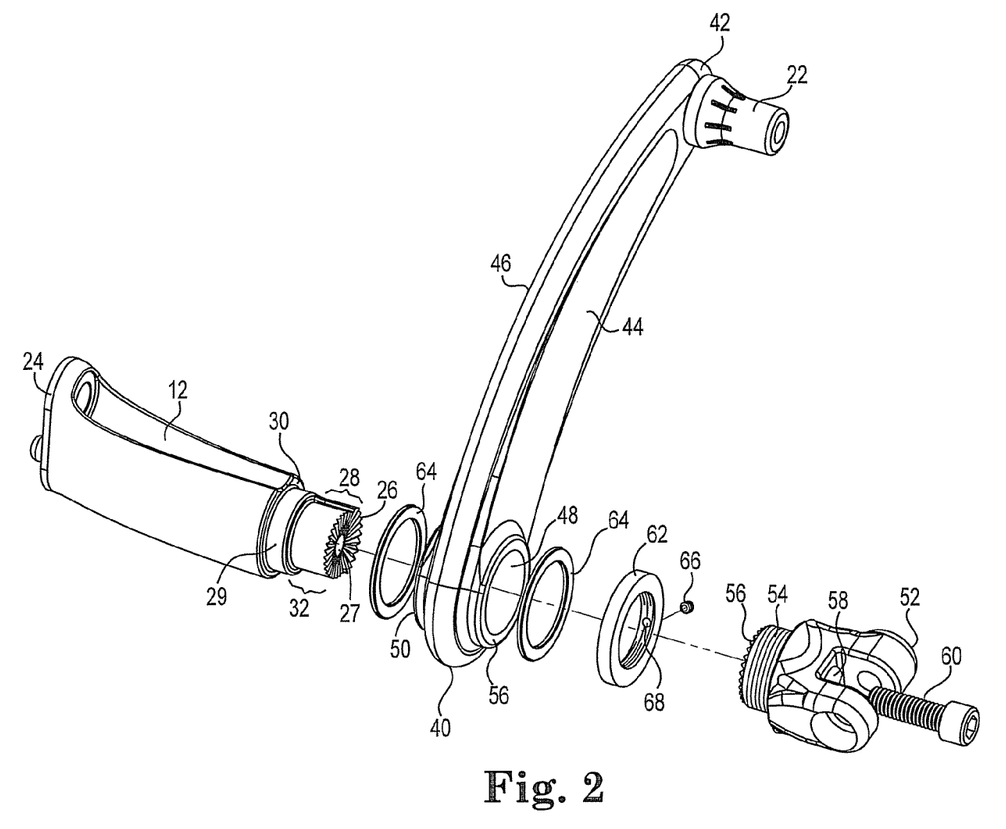
FIG. 2 is an exploded view of the pivotable passenger peg assembly of FIG. 1.

FIG. 2 is an exploded view of the passenger peg assembly 10 of FIG. 1. As shown in FIG. 2, mount 12 includes a first end 24, which is configured for connection to a motorcycle structure, and a second end 26. Mount 12 comprises an end portion 28 configured to define a cylindrical outer surface 29 that extends from second end 26 to a radial shoulder 30 formed in mount 12. Immediately adjacent to second end 26, a radial portion 32 of the cylindrical outer surface is recessed to define a cylindrical surface having a smaller radius than that of cylindrical outer surface 29. The second end 26 is configured with a splined surface and an axially positioned internally threaded bore 27 that extends from second end 26 into end portion 28.

Arm 14 comprises an elongate body having a first end 40, a second end 42, a first side 44 and a second side 46. Arm 14 is formed with a cylindrical opening 48 adjacent to first end 40 that extends from first side 44 to second side 46. A circular shoulder 50 frames the opening 48 on opposite sides of arm 14. Opening 48 has a diameter that is sized to receive end portion 28 of mount 12 therein.

Peg mount 16 in one embodiment comprises a clevis 52 to pivotally receive a foot support, e.g., a foot peg, and a threaded post 54 with a splined end surface 56 configured to mate with the splined surface of the second end 26 of mount 12. A bore 58 is provided through the threaded post 54 to receive a bolt 60 which has a length sufficient to thread into the internally threaded bore 27 of mount 12. A threaded tension nut 62 threads on to the threaded post 54 of peg mount 16 prior to assembly of passenger peg assembly 10. To assemble passenger peg assembly 10, bushings 64, which may be brass or a suitable polymer, are positioned adjacent to the circular shoulders 50, and 56. Opening 48 of arm 14 is then positioned over end portion 28 of mount 12 and peg mount 16 is inserted through opening 48 until the splined end surface 56 mates with the splined surface of second end 26 of mount 12. Bolt 60 is then threaded into bore 27 and tightened to secure peg mount 16 to mount 12. Tension nut 62 is rotated to move nut 62 toward bushing 64 to urge bushing 64 against shoulder [50] 56 on first side 44 of arm 14 and coincidentally to urge shoulder 50 and bushing 64 on second side 46 toward radial should 30 of mount 12 thereby creating variable resistance to rotation of arm 14 about the end portion 28 of mount 12. Once tension nut 62 is adjusted to a preferred level of tensioning, nut 62 can be locked in position by a jam screw 66 that threads into a threaded bore 68 formed through a side wall of nut 62.

Figure 3:
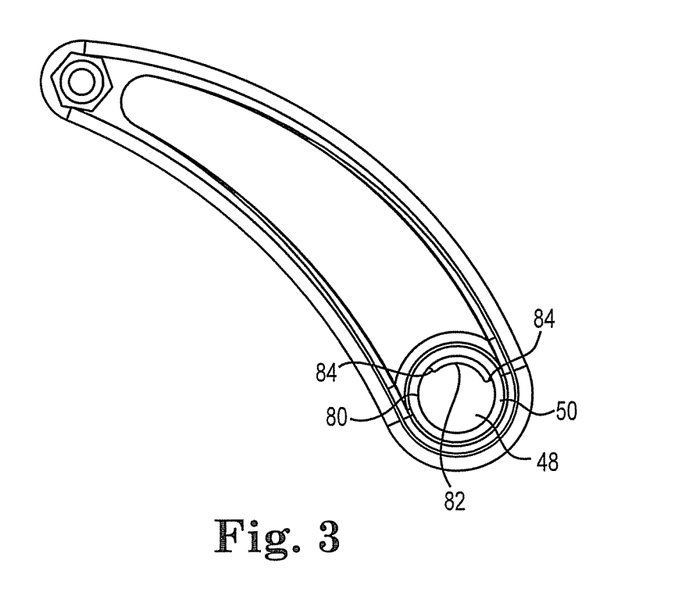
FIG. 3 is a side view of an arm of the pivotable passenger peg assembly of FIG. 1.
Figure 4:
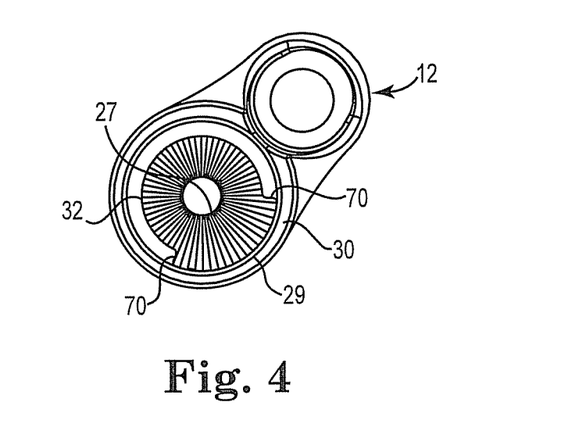
FIG. 4 is an end view of a motorcycle mount of the pivotable passenger peg assembly of FIG. 1.
Figure 5A:
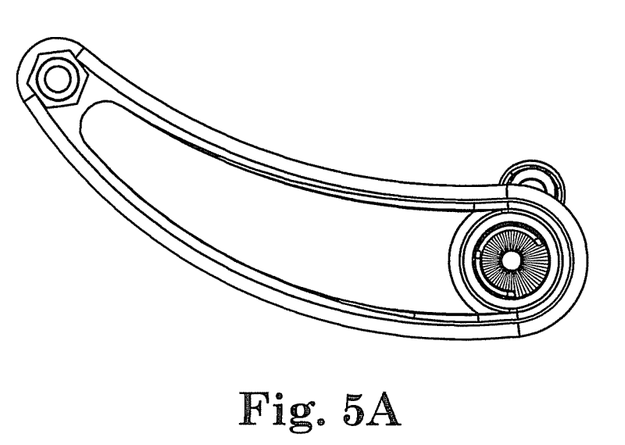
FIG. 5A is a side view of the pivotable passenger peg assembly of FIG. 1 with the arm oriented in a first stopped position.
Figure 5B:
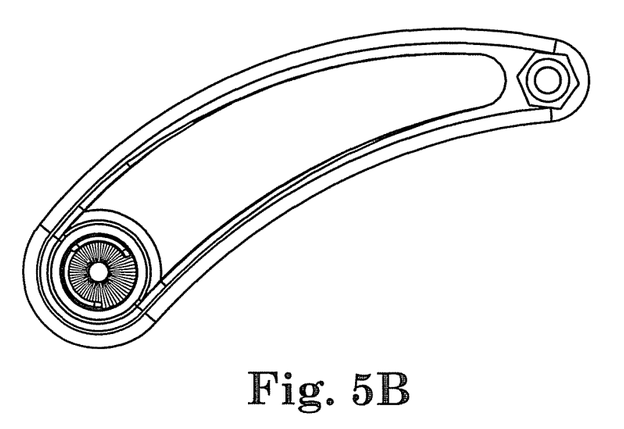
FIG. 5B is a side view of the pivotable passenger peg assembly of FIG. 1 with the arm oriented in a second stopped position.

As shown in FIG. 4, radial portion 32 of end portion 28 is recessed relative to outer cylindrical surface 29 through an arc of about 240 to about 260 degrees, which creates stop surfaces 70 at opposite ends of radial portion 32. In one embodiment the recessed end portion 28 extends through an arc of about 247 degrees. Stop surfaces 70 define the ends of pivotal travel of arm 14. As shown in FIG. 3, opening 48 of arm 14 includes an inner cylindrical surface 80 which has a diameter that is slightly larger than an outer diameter of cylindrical surface 29 of mount 12. A radial portion of opening 48 is configured with a detent 82, which is formed by an integral arc of material forming arm 14 that is dimensioned to define a zone of decreased diameter of opening 48 to fit in the recess of radial portion 32. Detent 82 extends through an arc of about 90 to about 115 degrees, and more specifically through an arc of about 112 degrees. The ends 84 of detent 82 define bearing surfaces that restrict the range of pivotal travel of arm 14 to the limits of stop surfaces 70. As shown in FIGS. 5A and 5B, detent 82 is located on the inner surface 80 to allow arm 14 to pivot to a first stopped position located clockwise of a twelve o'clock position relative to a motorcycle and to a second stopped position located counter-clockwise of the twelve o'clock position. In the first stopped position, a passenger is able to use a footpeg mounted on the second peg mount 22. In the second stopped position, assembly 10 is stored in a position that does not interfere with a passenger's desire to utilize only the first peg mount 16.

Figure 6:
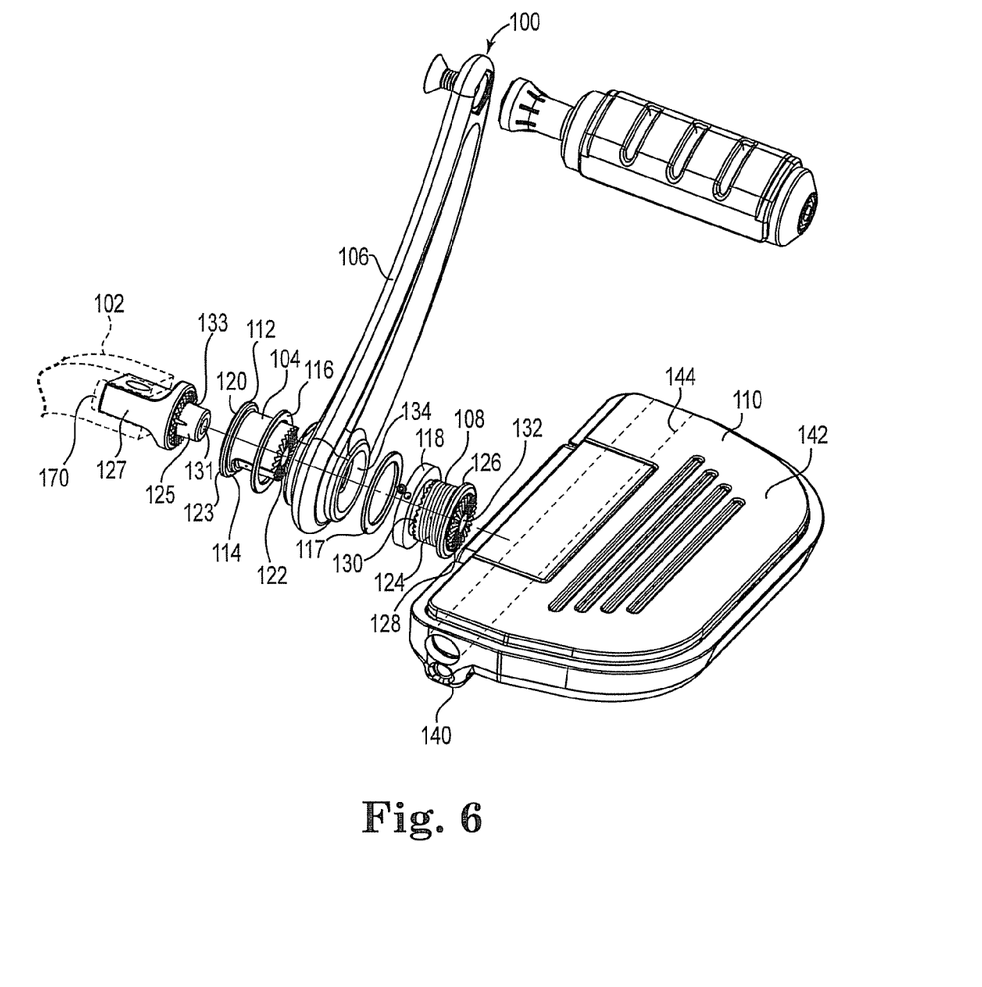
FIG. 6 is a perspective view of a second embodiment of a motorcycle pivotable passenger peg assembly of the present invention.

FIG. 6 is a perspective view of a second embodiment of pivotable passenger peg assembly 100, which highlights the versatility of the present invention relative to different mounting structures on a motorcycle and different foot support structures that may be employed with the present invention. In particular, passenger peg assembly 100 is mountable to a clevis-type motorcycle mount 102 common on some motorcycles (not shown) that is typically used to mount a pivotable foot peg. Passenger peg assembly 100 comprises a first cylindrical member 104, which in general duplicates the stepped cylindrical surface features of the radial portion 32 of end portion 28 of mount 12 (FIG. 2), an arm 106, which is identical to arm 14 of the first embodiment, and a second cylindrical member 108, which generally duplicates the features of the threaded post 54 of peg mount 16 of the first embodiment. In the embodiment shown, passenger peg assembly 100 may be connected to a passenger foot board 110.

The first cylindrical member 104 includes a radially enlarged head 112 which defines a radial shoulder 114 against which bushing 116 bears when tension nut 118 is threaded toward arm 106, such as was described relative to passenger peg assembly 10. The opposing faces of the first cylindrical member 104 are configured with splined surfaces 120, 122 and an axial bore 123 that extends the length of first cylindrical member 103 and is exposed at splined surfaces 120, 122. Bore 123 is enlarged in diameter adjacent to splined surface 120 to receive a mating cylindrical protrusion 125 of a mounting adapter 127, which is configured to connect to the mount 102. Protrusion 125 includes an internally threaded bore 131. Adapter 127 includes a splined face 133 that faces the splined surface 120 of the first cylindrical member 104.

The second cylindrical member 108 comprises a threaded outer cylindrical surface 124 to receive the tension nut 118 and a radially enlarged head 126. Opposing faces of the second cylindrical member 108 are configured with splined surfaces 128, 130 and an axial bore 132 that extends the length of the second cylindrical member and is exposed at splined surfaces 128, 130. With bushings 116 and 117 and tension nut 118 in place as previously described, passenger peg assembly 100 is assembled by inserting the first cylindrical member 104 into opening 134 of arm 106 from a first direction and inserting the second cylindrical member into opening 134 from a second opposite direction. An elongate bolt (not shown) is then inserted through an opening on a connecting site on floorboard 110 and through bores 132 and 123 and into bore 131. When the elongate bolt is threaded into bore 131 and tightened, the splined face 133 of adapter 127 mates with the splined face 120 of the first cylindrical member 104, the splined face 122 of the first cylindrical member mates with the splined face 130 of the second cylindrical member 108, and the splined face 128 of the second cylindrical member 108 mates with a corresponding splined connecting site on floorboard 110. The splined face 120 of the first cylindrical member 104 permits rotation of the first cylindrical member to adjust the location of the stops in the stepped cylindrical surface to define the desired range of rotation of arm 106. The splined face 128 of the second cylindrical member 108 allows for rotational adjustment of the foot board 110.

Figure 7:
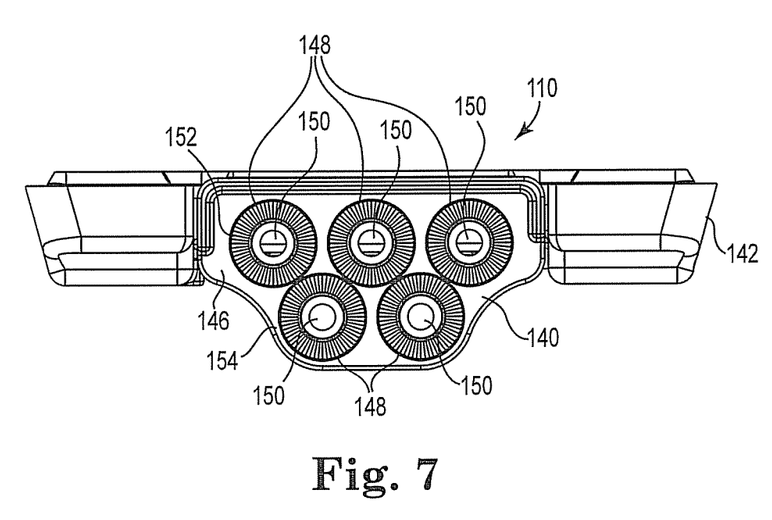
FIG. 7 is a side view of a foot board showing multiple mounting sites on a vertical mounting plate of the foot board.

As shown in FIGS. 6 and 7, foot board 110 comprises a vertical mounting plate 140 and a horizontal foot support 142, which is pivotally mounted to the vertical mounting plate 140 via a pivot pin (shown in phantom). The vertical mounting plate 140 has an outer surface 146 that faces toward passenger peg assembly 100 and is configured with a plurality of circular splined mounting sites 148 each of which circumscribes a mounting hole 150 formed in mounting plate 140. Mounting holes 150 are provided to receive a mounting bolt and are configured for connecting foot board 110 to a desired mounting structure. In one embodiment, the mounting sites 148 are arranged linearly in a first horizontal row 152 and a second horizontal row 154 located below the first row 152. The openings 150 of mounting sites 148 in the second row 154 are vertically offset relative to the openings 150 in the first row 152 such that each mounting site 148 of the second row 154 is vertically below the midpoint between the openings 150 of two mounting sites 148 in the first row 152. The use of multiple mounting sites 148 as described allows for multiple mounting options of foot board 110, whether footboard 110 is being mounted to the second cylindrical member 108 of passenger peg assembly 100, directly to the mounting adapter 127, or to a motorcycle mount such as mount 12 described relative to the first embodiment above. Since other motorcycle structures of various options and locations may surround the location of the motorcycle mount 102, it is problematic to fashion a foot board with a single mounting structure that allows the foot board to fit in all possible mounting environments that may be encountered. The configuration of multiple splined mounting sites 148 on the vertical mounting plate 140 of foot board 110 is a inventive aspect of foot board 110 that enables a single foot board to be mounted to a motorcycle with the best fit relative to the particular mounting environment that may exist around the motorcycle mount. Independently, the use of various mounting sites as described enables the user to define the preferred location of the foot board for optimal user comfort.

Figure 8A:
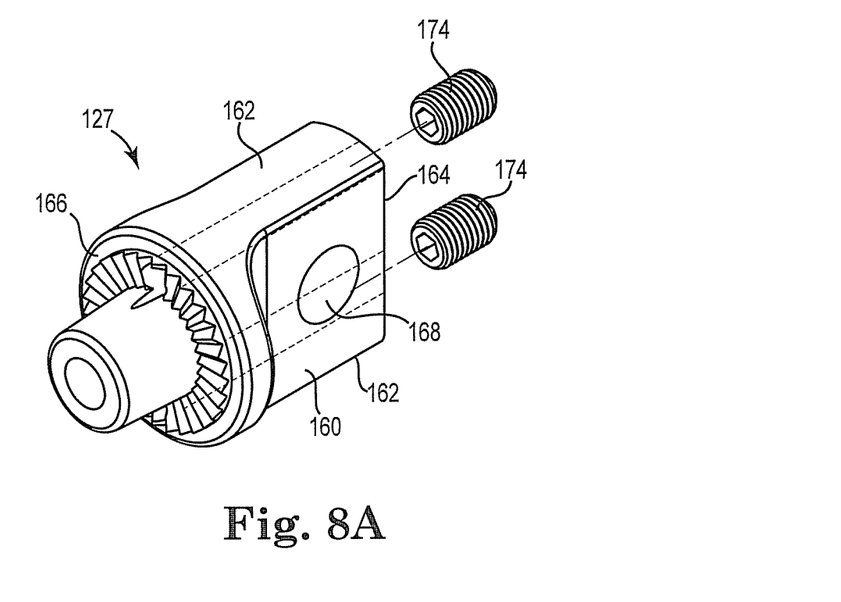
FIG. 8 is a perspective view of a mounting adapter for mounting the pivotable passenger peg assembly of the present invention to a clevis-type motorcycle mount.
Figure 8B:
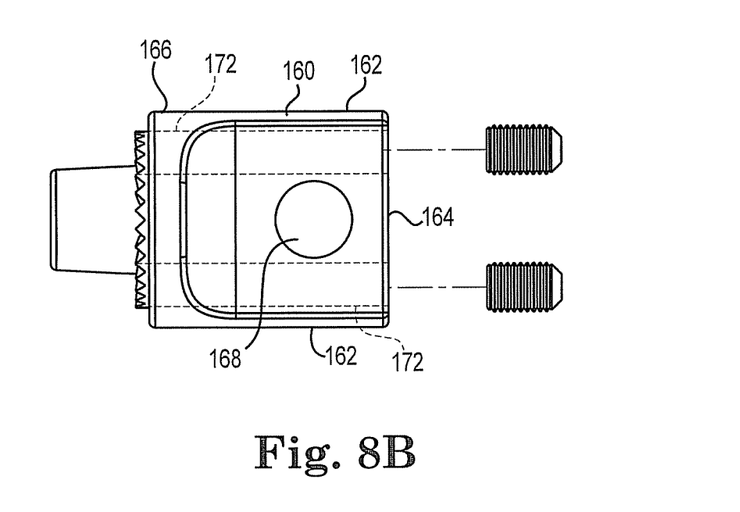

FIG. 8 is a perspective view of mounting adapter 127, which enables use of a clevis-type mount 102, commonly found on some motorcycles for pivotally mounting a footpeg, to attach a foot support that does not pivot relative to the mount. Mounting adapter 127 comprises a rectangular body 160 having first and second generally parallel sides 162 and an end surface 164 that is generally transverse to sides 162. Opposite end surface 164, adapter 127 comprises a circular head 166 that is configured to define the splined face 133 and the protrusion 125 previously described relative to FIG. 6. Centrally located between sides 162 and spaced from end surface 164 is a mounting hole 168, which is configured to align with standard mounting holes in the opposed flanges of the clevis-type mount. The location of mounting hole 168 is selected such that end surface 164 does not contact a floor 170 of the clevis-type mount (FIG. 6) when a connecting pin is inserted through the standard mounting holes of the clevis-type mount and mounting hole 168. To secure end surface 164 relative to floor 170, adapter 127 is provided with a pair of spaced, internally threaded bores 170 on either side of mounting hole 168 that extend from the splined face 133 to the end surface 164. Bores 172 receive set screws 174 which can be threaded to engage floor 170 to fix adapter 127 at a desired position relative to floor 170. With set screws secured relative to floor 170, adapter 127 establishes a non-pivotal connection for a foot support structure, such as passenger peg assembly 10, 100, or foot board 110.

In summary, the present invention includes a pivotable passenger peg assembly that is mountable to a motorcycle. In one embodiment the assembly includes an elongate arm with a cylindrical opening that is pivotally mounted on a first cylindrical member that is mountable to a motorcycle. The first cylindrical member is configured with a stepped outer cylindrical surface that cooperates with a detent formed within the opening of the arm to limit the pivotal range of the arm. The first cylindrical member may be incorporated into a motorcycle mount or may be adapted to attach to a motorcycle mount. A mount adapter suited for connecting a passenger peg assembly or other foot support to a clevis-type motorcycle mount was disclosed with features allowing the adapter to connect to one embodiment of the first cylindrical member. A second cylindrical member connects to the first cylindrical member in the arm opening and is configured to carry a tension nut that can be adjusted relative to the arm to frictionally restrict the freedom of pivotal movement of the arm. The second cylindrical member is also configured for connection to a foot support, such as a foot peg or a foot board. A particular foot board having multiple splined mounting sites on a mounting plate of the foot board has also been disclosed to facilitate connection of the foot board to motorcycles having different mounting environments.

Although specific embodiments have been illustrated and described herein, it will be appreciated by those of ordinary skill in the art that a variety of alternate and/or equivalent implementations may be substituted for the specific embodiments shown and described without departing from the scope of the present invention. Therefore, it is intended that this invention be limited only by the claims and the equivalents thereof.

What is claimed is:

1. A motorcycle passenger peg assembly comprising:
   a mount for attachment to a motorcycle;
   a cylindrical member connectable to the mount, the cylindrical member having an outer cylindrical surface, a first portion of the outer cylindrical surface having a first radius, a second portion of the outer cylindrical surface having a second radius less than that of the first portion, the second portion defining a greater portion of a circumference of the outer cylindrical surface;
   an arm having a first end portion and a second end portion, the first end portion defining an opening having an inner cylindrical surface, the second end portion configured for connection to a foot peg, the inner cylindrical surface having a first portion with a radius that approximates the radius of the first portion of the outer cylindrical surface, the inner cylindrical surface having a second portion with a radius that is less than that of the first portion of the inner cylindrical surface, and approximates the radius of the second portion of the outer cylindrical surface, the second portion of the inner cylindrical surface defining a lesser portion of a circumference of the inner cylindrical surface;
   wherein the inner cylindrical surface is pivotably mounted to the cylindrical member with the first portion of the inner cylindrical surface positioned over the first portion of the outer cylindrical portion and the second portion of the inner cylindrical portion positioned over the second portion of the outer cylindrical surface, such that the second portion of the inner cylindrical surface pivots within the second portion of the outer cylindrical surface and restricts the range of pivotable movement of the arm.

2. The motorcycle passenger peg assembly of claim 1 wherein the second portion of the outer cylindrical surface defines an arc of between about 240 degrees to about 260 degrees.

3. The motorcycle passenger peg assembly of claim 1 wherein the second portion of the outer cylindrical surface defines an arc of about 247 degrees.

4. The motorcycle passenger peg assembly of claim 1 wherein the second portion of the inner cylindrical surface defines an arc of about between 90 degrees to about 115 degrees.

5. The motorcycle passenger peg assembly of claim 1 wherein the second portion of the inner cylindrical surface defines an arc of about 112 degrees.

6. The motorcycle passenger peg assembly of claim 1 wherein the cylindrical member comprises an internal bore, the cylindrical member extending through the opening of the arm first end portion and being connectable to a foot peg mount.

7. The motorcycle passenger peg assembly of claim 6 wherein the cylindrical member and foot peg mount have splined mating surfaces.

8. The motorcycle passenger peg assembly of claim 6 wherein the foot peg mount includes a contact surface for contacting the arm to provide resistance to pivotal movement of the arm.

9. The motorcycle passenger peg assembly of claim 8 wherein the foot peg mount contact surface is adjustable to vary the resistance to pivotal movement of the arm.

* * * * *